United States Patent [19]

Aizawa et al.

[11] 4,053,240
[45] Oct. 11, 1977

[54] OBJECT DISTANCE MEASURING SYSTEM FOR AN OPTICAL INSTRUMENT

[75] Inventors: Hiroshi Aizawa; Kazuya Hosoe, both of Machida; Seiichi Matsumoto, Yokohama; Hideo Yokota, Tokyo, all of Japan

[73] Assignee: Canon Kabushiki Kaisha, Tokyo, Japan

[21] Appl. No.: 515,927

[22] Filed: Oct. 18, 1974

[30] Foreign Application Priority Data

Oct. 26, 1973 Japan .............................. 48-120555

[51] Int. Cl.² .......................... G01C 3/08; G03B 13/20
[52] U.S. Cl. ........................................ 356/4; 250/201; 250/204; 354/4; 354/25; 354/163
[58] Field of Search ............... 356/4, 125, 126; 250/204, 234, 201; 353/101; 352/140; 354/25, 31, 163

[56] References Cited

U.S. PATENT DOCUMENTS

| 3,274,913 | 9/1966 | Biedermann et al. ............... 354/25 |
| 3,364,815 | 1/1968 | Smith et al. ......................... 352/140 |
| 3,469,925 | 9/1969 | Urbach et al. ....................... 353/101 |
| 3,493,764 | 2/1970 | Craig ................................... 356/125 |

*Primary Examiner*—Vincent P. McGraw
*Attorney, Agent, or Firm*—Toren, McGeady and Stanger

[57] ABSTRACT

A method and an apparatus is disclosed for detecting the sharpness of the object image suited for optical instruments such as a camera and for adjusting the focus of the optics by means of photoelectric means presenting a non-linear resistance-illumination characteristics such as CdS or CdSe. Such an object image may be formed by means of the optics on the above mentioned photoelectric means presenting the electrodes at both ends along the longer side of a photoelectric semiconductor whose longer side is extremely long as compared with the shorter side as well as on the above mentioned photoelectric means presenting the electrodes at both ends along the shorter side of the photoelectric semiconductor. An object distance measuring system which digitally displays the distance between camera and photographing object when an automatic focusing operation is carried out is also disclosed.

22 Claims, 26 Drawing Figures

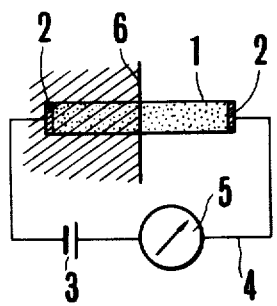
FIG.1A
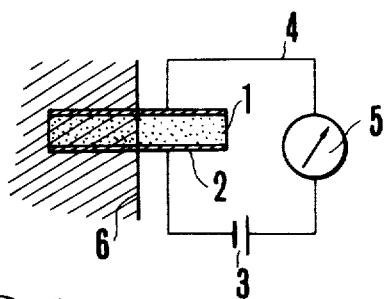
FIG.1B
FIG.2
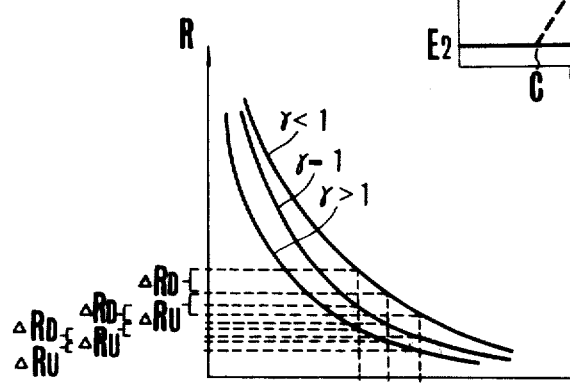
FIG.3A
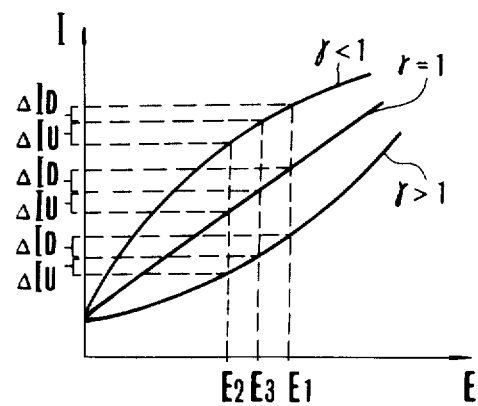
FIG.3B

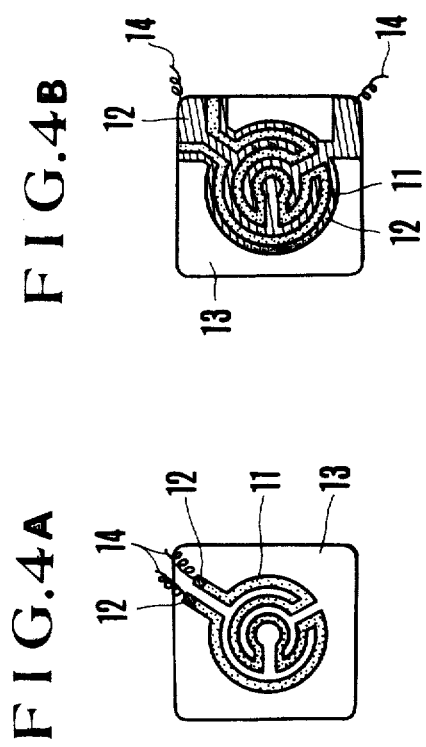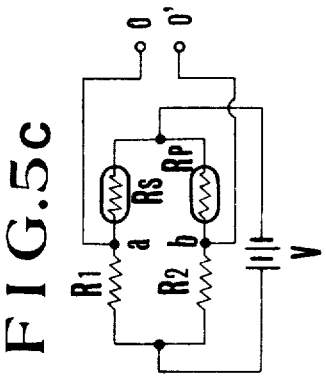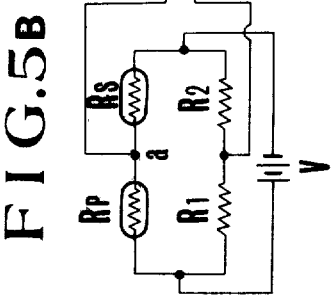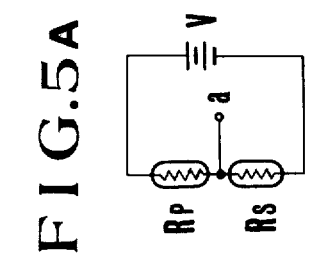

OBJECT DISTANCE MEASURING SYSTEM FOR AN OPTICAL INSTRUMENT

BACKGROUND OF THE INVENTION:

1. Field of the Invention

The present invention relates to an object distance measuring system for digitally displaying the distance between the camera and photographing object when an automatic focusing operation is carried out.

2. Description of the Prior Art

So far methods and apparatus for detecting the sharpness of the object image suited for optical instruments such as a camera have been disclosed, for example, in the Japanese Patent Publication Nos. Sho 39-29120 and Sho 41-14500 applied for patent of the applicant of the present invention and the U.S. Pat. No. 3,562,785 applied for patent by Dwin Richardson Craig (corresponding to DAS 1173327 and Japanese Patent Publication No. Sho 44-9501).

The Japanese Patent Publication No. Sho 39-29120 relates to a method for detecting the sharpness of the image object by knowing the variation of the internal resistance and that of the electromotive force of the photoelectric means taking place when an image of the object is formed on the photoelectric means by making use of the non-linear resistance-illumination characteristics considerably peculiar to the photoelectric means such as CdS or CdSe.

Further the Japanese Patent Publication No. Sho 41-14500 is an improvement of the instrument according to the Japanese Patent Publication No. Sho 39-29120, relating to an apparatus characterized in that two photoelectric means presenting a photoconductive material such as CdS are disposed before and behind the expected focus plane, whereby both photoelectric means are connected with a differential circuit in such a manner that the difference of the outputs between both photoelectric means due to the focus adjusting situation of the optics is detected so as to detect the focus of the optics.

Further, the U.S. Pat. No. 3,562,785 makes use of the principle of the Japanese Patent Publication No. Sho 39-29120, proposing a method characterized in that the image of an object is projected by means of optics on the image receiving plane of the two photoelectric means presenting a non-linear illumination-resistance characteristics in such a manner that the one photoelectric means receives a clear image and the other photoelectric means receives a dispersed image, whereby the optics is adjusted until the electrical response signal by means of both photoelectrical means reached maximum, by detecting the variation of the resistance value of the photoelectric means caused by the variation of the distribution of the light of the image receiving plane on the photoelectric means due to the variation of the sharpness of the image and an equipment for automatically adjusting the optics making use of the electrical response signal by means of both photoelectrical response signal.

The above mentioned non-linear resistance-illumination characteristics of the photoelectric means signifies a phenomenon such that as the sharpness of the object image formed on the photoelectrical means is increased, the electrical characteristics, especially the resistance value of the above mentioned photoelectrical means is increased or decreased, whereby the phenomenon is based upon the fact that the quantity of the incident light beam per unit area of the photoelectric material varies according to the variation of the sharpness of the object image in such a manner that at the maximum sharpness a considerable inclination takes place in the distribution of the quantity of the incident light beam on each point of the photoelectrical material.

In other words, the above mentioned phenomenon is based upon the fact that the difference of the quantities of the light beam among the bright parts and the dark parts of the object image is maximum when the sharpness of the object image is maximum in such a manner that the difference of the resistance values among each parts of the photoconductive material becomes large. However, as to the objects which are in real existence and often photographed, the distribution of the bright parts and of the dark parts is remarkably irregular whereby it can not always be said that the difference of brightness between the bright parts and the dark parts, namely the contrast is large, so that it must be said that only by forming an object image on the surface of a photoelectric means presenting a certain extent, consisting the above mentioned photoconductive material, a sufficient photoelectric effect can not be obtained and therefore it is difficult to obtain a very precise detection of the sharpness of the object image.

SUMMARY OF THE INVENTION

The first purpose of the present invention is to offer a method and an apparatus for detecting the sharpness of the object image with high accuracy by making a sufficient use of the non-linear resistance illumination characteristics of photoelectric means.

The second purpose of the present invention is to offer a method and an apparatus for detecting the sharpness of the object image presenting a function to automatically detecting the focus of an object of any pattern with high accuracy.

The third purpose of the present invention is to offer a method and an apparatus capable of detecting the state of the sharpness of the object image when from a certain reason it is difficult or impossible to detect the sharpness of the object image.

The fourth purpose of the present invention is to offer a method and an apparatus for detecting the sharpness of the object image by detecting the difference of the electrical characteristics between two photo-electric means which difference becomes larger according as the sharpness of the object image is more increased due to the fact that a reversed characteristics is produced on the non-linear resistance illumination characteristics of a photoelectric means according to the property proper to the photoelectric means, the disposition of the electrode and of the electrical circuit and further according to the state of the object image formed on the above mentioned photoelectrical means, whereby the capability for detecting the sharpness of the object image is remarkably increased by providing a means to eliminate the difference between the electrical characteristics arising from the constructual difference of the above mentioned photoelectrical means and having nothing to do with the sharpness of the object image.

The fifth purpose of the present invention is to offer a method and an apparatus for detecting the sharpness of the object image capable of delicately detecting the sharpness of any object image with low contrast by detecting the difference of the electrical characteristics between two photoelectrical means which difference becomes larger according as the sharpness of the object image is more increased due to the fact that reversed characteristics are produced according to the state of the object image formed on the photoelectrical means.

The sixth purpose of the present invention is to offer a method and an apparatus for detecting the sharpness of the object image being capable of delicately detecting the difference corresponding to the sharpness of the object image, of the electrical characteristics between the two photoelectrical means and consisting of a sharpness detecting circuit of object image presenting above mentioned two photoelectrical means connected with the feed back circuit and the input circuit of the operation amplifier for the purpose of detecting the sharpness of the object image, by detecting the difference of the electrical characteristics between the two photoelectrical characteristics which difference is increased according as the sharpness of the object image is increased due to the fact that reversed characteristics are produced between the two photoelectrical means according to the state of the object image formed on the photoelectrical means.

The seventh purpose of the present invention is to offer a method and an apparatus for detecting the sharpness of the object image suited for adjusting the focus of optical instruments such as camera and for displaying a distance between object and camera.

The eighth purpose of the present invention is to offer a camera capable of detecting the sharpness of the object image and automatically adjusting the focus.

Further other purposes of the present invention will be disclosed below in detail according to the following explanation and the attached drawings of the embodiments of the present invention.

EXPLANATION OF THE DRAWINGS

FIG. 1 shows principle constructions of the photoelectric means suited for the present invention.

FIG. 2 shows a diagram to show the idea of the distribution of the illumination of the light beam coming from the object on the photoelectrical means.

FIG. 3 shows diagrams to show the relation between the resistance value R and the illumination E and among the photoelectrical current I and the illumination E in case $\gamma > 1$, $\gamma = 1$ and $\gamma < 1$, respectively.

FIG. 4 shows an embodiment of the series type element and that of the parallel type element suited for the present invention.

DESCRIPTION OF THE PREFERRED EMBODIMENTS

Figure 5E:
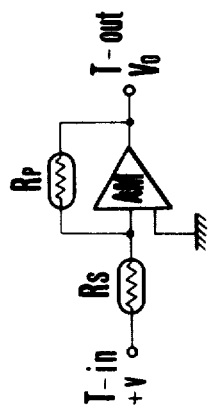
FIG. 5 shows various embodiments of the sharpness detecting circuit of the object image.

Below the present invention will be explained according to the attached drawings of the embodiments of the method and the apparatus for detecting the sharpness of the object image according to the present invention.

FIGS. 1A and 1B show the construction of the photoelectric means suited for the present invention, whereby FIG. 1A shows a photoelectric means in which a photoelectric member (hereinafter called series type member) consisting of two electrodes provided on the shorter side of a photoelectric semiconductor 1, whose longer side is remarkably long as compared with the shorter side, is connected with the current source by means of the conductor 4, while FIG. 1B shows a photoelectric means in which a photoelectric member (hereinafter called parallel type member) consisting of two electrodes 2 provided on the longer side of a photoelectric semiconductor 1 is connected with the current source 3 by means of the conductor 4. In FIGS. 1A and 1B, 5 is an ampere meter for measuring the photoelectric current, 6 the boundary line between the bright and the dark part of the object image formed on the above mentioned photoelectric members by means of an object image forming optics not shown in the drawing.

In case thus a photoelectric member is constructed in such a manner that the shorter side of the member is remarkably short as compared with the longer side, it is thought that the frequency that the boundary line 6 between the bright and the dark part of the object image on the photoelectric semiconductor becomes as shown in the drawing be very high. In other words, the boundary line 6 between the bright and the dark part is almost perpendicular to the direction of the photoelectric current in case of the series type member (FIG. 1A), while the boundary line 6 is almost parallel.

The situation of the variation of the electrical characteristics especially of the resistance value respectively the photoelectric current coming from the sharpness of the object image of two kinds of the photoelectrical members which are different from each other in the construction, as is shown in FIGS. 1A and 1B, will be explained below.

FIG. 2 shows a diagram for showing the idea of the distribution of the illumination of the light beam coming from the object, on the photoelectric member, whereby the illumination is shown along the ordinate while the distribution territory on the photoelectric member is shown along the abscissa, whereby the full line shows the distribution state of the illumination when the sharpness of the object image is maximum while the broken line shows the distribution state of the illumination when the sharpness of the object image is decreased.

It is known in general that the electrical characteristics, especially the relation between the resistance value R and the illumination E can be expressed by the equation $$R = KE^{-\gamma} \quad (1)$$

whereby $K$ and $\gamma$ are values proper to the photoelectric semiconductor in question.

Thus it is clear that the following equation is established $$I = K'E^{\gamma} \quad (2)$$

whereby I is the photoelectrical current when a certain voltage is given to the above mentioned photoelectric semiconductor. Hereby K' is a constant determined by the characteristics proper to the photoelectric semiconductor and the voltage given.

FIGS. 3A and 3B respectively shown the relation between R and E and between I and E in case $\gamma > 1$, $\gamma = 1$ and $\gamma < 1$.

Let us, first of all, suppose that with reference to the characteristics of the series type member shown in FIG. 1A, the distribution of the illumination in the neighborhood of the boundary line 6 between the bright and the dark part on the light beam receiving plane of the series type member be changed from the state shown in full line A — A to the state shown in broken line B -C in FIG. 2. Namely let us suppose that the illumination in the right neighborhood AB of the point A be decreased while the illumination in the left neighborhood AC of the point A is increased. Hereby the illumination $E_3$ can be thought as the mean value of $E_1$ and $E_2$. When the length of the part AB and that of the part AC are very small with reference to the relation between the variation of the illumination and the local variation of the resistance value in FIG. 3A, it can be thought that the above mentioned decrease in the illumination nearly corresponds to the variation of the illumination from $E_2$ to $E_3$ while the above mentioned increase in the illumination nearly corresponds to the variation of the illumination from $E_2$ to $E_3$. Thus as is shown in FIG. 3A, the increase of the resistance value due to the variation of the illumination is $\Delta R_U$ in case $\gamma < 1$ while the decrease in the resistance value is $\Delta R_D$. On the other side, the twice differentiation of the equation (1) becomes $$\frac{d^2R}{dE^2} = K\gamma(\gamma + 1)E^{-(\gamma + 2)} > 0$$

from which $\Delta R_D$ is clearly longer than $\Delta R_U$. Thus the arithmetic sum of the variation of the resistance values due to the local variation of the illumination is negative and therefore after all the resistance value of the whole photoelectric semiconductor 1 decreases while the photoelectric current increases. This fact is clearly established also in case $\gamma = 1$ and $\gamma > 1$. In other words, it can be understood that in case of the series type member the resistance value is maximum when the sharpness of the object image is maximum (the photoelectric current is maximum) regardless of the value or $\gamma$.

Then let us investigate the characteristics of the parallel type member shown in FIG. 1B. In this case, let us consider the relation beteen I and E shown in FIG. 3B for the sake of the easy understanding. When the decrease of the photoelectric current due to the decrease of the illumination at the part AB is expressed in $\Delta I_D$, while the increase of the photoelectric current due to the increase in the illumination at the part AC is expressed in $\Delta I_U$, the following equation is obtained from the equation $$\frac{d^2I}{dE^2} = K'\gamma(\gamma - 1)E^{\gamma - 2} \quad (2)$$

and in case $\gamma < 1$, $\gamma = 1$ and $\gamma > 1$, the following relations are obtained respectively:

$$\frac{d^2I}{dE^2} < 0, \frac{d^2I}{dE^2} = 0, \frac{d^2I}{dE^2} > 0$$

Thus in case $\gamma < 1$, $\Delta I_U > \Delta I_D$, in case $\gamma = 1$, $\Delta I_U = \Delta I_D$ and in case $\gamma > 1$, $\Delta I_U < \Delta I_D$. In consequence the photoelectric current flowing through the whole photoelectric semiconductor is minimum (the resistance value is maximum) when the sharpness of the object image is maximum in case $\gamma < 1$, the photoelectric current flowing through the whole photoelectric semiconductor is constant (the resistance value is constant) regardless of the local variation of the sharpness of the object image in case $\gamma = 1$ and the photoelectric current flowing through the whole photoelectric semiconductor is maximum (the resistance value is minimum) when the sharpness of the object image is maximum in case $\gamma > 1$.

From the above consideration it is clearly understood that the electrical characteristics, especially the aspect of the variation of the resistance value due to the variation of the sharpness of the object image of the series type member is reversed to that of the parallel type member in case $\gamma > 1$, although both types of the members present non-linear photoelectric effect of the photoelectric semiconductor. When on the series type member and on the parallel type member consisting of a photoelectric semiconductor in which $\gamma$ is smaller than 1, the same object image is formed, the resistance value is increased according as the sharpness of the object image on the series type members is increased while the resistance value is decreased accordingly as the sharpness of the object image on the parallel type members is increased, so that the difference between the resistance value of the series type member and that of the parallel type member is remarkably increased in such a manner that the detectability is much improved as compared with the case the sharpness of the object image is detected by means of only one type of the photoelectric members.

In short, the present invention is intended to delicately detect the sharpness of the object image by superposing the detectabilities of the series type member and of the parallel type member which detectabilities are reversed to each other.

FIGS. 4A and 4B respectively shown an embodiment suited for the present invention, of the above mentioned series type member and of the above mentioned series type member and of the above mentioned parallel type member. As is shown in FIG. 4A the series type member is constructed in such a manner that the electrodes 12 are formed along the shorter sides of arc-shaped photoelectric semiconductor 11 being provided on a non-conductive base plate 13. On the other hand as is shown in FIG. 4B, the parallel type member is constructed in such a manner that the electrodes 12 are formed along the longer sides of the arc-shaped photoelectric semiconductor 11 presenting a similar shape to that of the series type member and being provided on a non-conductive base plate 13. 14 in FIGS. 4A and 4B are the conductors connected with the above mentioned electrodes 12.

Although the shape of the photoelectric semiconductor 11 shown in FIGS. 4A and 4B is largely different from the shape of the photoelectric semiconductor 1 shown in FIGS. 1A and 1B, the basic construction is same in both photoelectric semiconductors. The photoelectric semiconductors shown in FIGS. 4A and 4B assume the shape of folded arc in order that the above mentioned efficiency is fulfilled sufficiently for an object image complicated in shape, taking into consideration the fact that an object image generally presents a complicated shape with boundary line between the bright and the dark parts along various directions. It goes without saying that the shapes of the photoelectric semiconductor is not limited to those shown in FIGS. 4A and 4B.

Below the sharpness detecting circuit of the object image consisting of a combination of the above mentioned types of photoelectric members will be explained according to the embodiments shown in FIGS. 5A to 5G. In FIGS. 5A to 5G, Rs represents the above mentioned series type member while Rp represents the above mentioned parallel type member.

FIG. 5A shows the case that Rs and Rp are connected in series and supplied with a voltage from an electrical current source whereby the electrical potential at the connection point of Rs and of Rp is varied according to the variation of the resistance value of Rs and of Rp. In case γ of Rp is larger than 1, according as the sharpness of the same object image on the photoelectric members is increased, the resistance value of Rs is increased while the resistance value of Rp is decreased in such a manner that the electrical potential at the point a is increased so that the electrical potential at the point a is maximum when the sharpness of the object image on the photoelectric members is highest.

FIG. 5B shows the case that a series circuit of Rp and Rs and a series circuit of the resistance $R_1$ and the variable resistance $R_2$ are connected in parallel with the electrical current source so as to form a bridge circuit. In case γ of Rp is larger than 1, according as the sharpness of the object image on Rs and Rp is increased the resistance value of Rs in increased while the resistance value of Rp is decreased in such a manner that the electrical potential at the connecting point a of Rs and Rp is increased so that the voltage produced between the outputs 0 and 0' becomes maximum when the sharpness of the object image is highest.

FIG. 5C shows the case that a series circuit of Rs and the resistance $R_1$ and a series circuit of Rp and the variable resistance $R_2$ is connected in parallel to the electrical current source so as to form a bridge circuit. In case γ of Rp is larger than 1, when the sharpness of the object image on Rs and Rp the electrical potential at the connecting point a of Rs and $R_1$ becomes maximum while the electrical potential at the connecting point b of Rp and $R_2$ becomes minimum so that the voltage produced between the outputs 0 and 0' of the bridge circuit becomes maximum.

When further the γ of Rp is almost equal to 1 in the circuit composition shown in FIG. 5C, the resistance value of Rp is varied only depending on the brightness of the object image independent of the sharpness of the object image in such a manner that as the sharpness of the object image is increased the electrical potential at the point a is increased while the electrical potential at the point b is not varied, only assuming the value corresponding to the brightness of the object so that the electrical potential difference between the outputs 0 and 0' becomes also maximum when the sharpness of the object image becomes highest. Thus the variation of the level between the outputs 0 and 0' due to the brightness of the object can be checked.

Figure 5G:
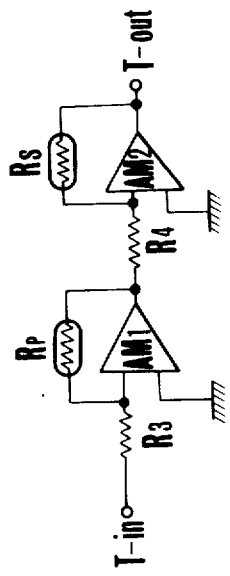
Figure 5D:
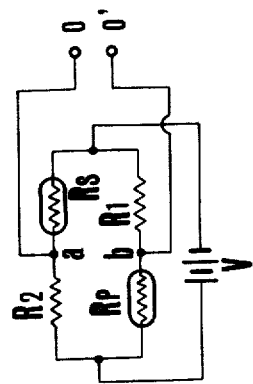

FIG. 5D shows the case on the two sides on the one diagonal line Rs and the Rp whose γ is smaller than 1 and on the two sides on the other diagonal line a resistance $R_1$ and a variable resistance $R_2$ are connected so as to form a bridge circuit to which a voltage is given from an electrical current source V. In this case, as the sharpness of the object image on Rs and Rp is increased the resistance value of Rs and that of Rp are increased in such a manner that the electrical potantial at the connecting point a of Rs and $R_2$ is increased while the electrical potential at the connecting point b of Rp and $R_1$ is decreased so that the electrical potential difference between the outputs O and O' of the bridge circuit becomes maximum when the sharpness of the object image is highest. Hereby the parallel type member Rp in which γ is smaller than 1 can be replaced with the series type member Rs with the same chararcteristics.

FIG. 5E shows the case that the member Rs is connected to the input circuit of the operation amplifier AM while the member Rp is connected to the feed back circuit of the above mentioned operation amplifier, whereby the output power $V_o$ appearing at the output T-out, when an input power +V is given to the ihput T-in of the above mentioned amplifier AM, is expressed by means of the following equation $$V_o = -\frac{Rp}{Rs} V$$

Thus in case γ of Rp is larger than 1 according as the sharpness of the object image on the photoelectric members is increased the resistance value of Rs is increased while the resistance value of Rp is decreased so that Rp/Rs is decreased. Namely, the gain of the operation amplifier AM is decreased and the output power $V_o$ becomes smaller. When the sharpness of the object image is maximum the output power $V_o$ is smallest so that the sharpness of the object image can be detected.

Figure 5F:
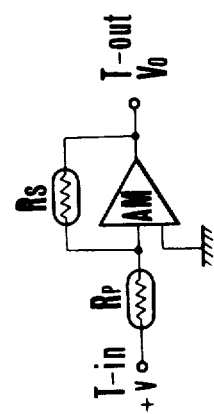

FIG. 5F shows the case that contrary to the case of FIG. 5E the element Rp is connected to the input circuit of the operation amplifier AM while the member Rs is connected to the feed back circuit of the above mentioned amplifier. In this case the output power $V_o$ is expressed by means of the following equation in regard to the input power +V;

$$V_o = -\frac{Rs}{Rp} V$$

Thus in case γ of Rp is larger than 1 according as the sharpness of the object image on the members is increased Rs/Rp becomes large. It is clear that a result quite contrary to the case of the circuit shown in FIG. 5E is obtained.

FIG. 5G shows the circuit in which 2 operation amplifiers $AM_1$ and $AM_2$ are connected in cascade whereby Rp and Rs are connected in the feed back circuits of both operation amplifiers $AM_1$ and $AM_2$ while the resistances $R_3$ and $R_4$ are connected in the input circuits, whereby the electrical potential at the output is varied according to the ratio of Rp × Rs to $R_3$ × $R_4$. Thus in case γ of Rp is larger than 1, according as the sharpness of the object image is increased the resistance value of Rp and that of $R_3$ are increased in such a manner that the electrical potential at the output T-out is increased so that the electrical potential at the output becomes maximum when the sharpness of the object image is highest.

Figure 6:
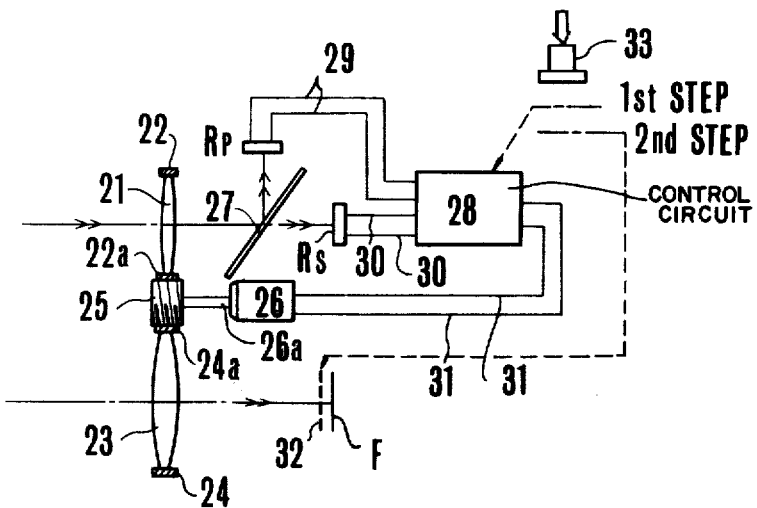
FIG. 6 shows an important part of the first embodiment of the automatic focus adjusting system consisting of a sharpness detecting apparatus of the object image suited for a camera and composed of one of the circuits shown in FIGS. 5A to 5G.

FIG. 6 shows an important part of the first embodiment of the automatic focus adjusting system consisting of a sharpness detecting apparatus of the object image suited for a camera and composed of one of the circuits shown in FIG. 5A to FIG. 5G. In the drawing, 21 is the sharpness detecting optics of the object image, 22 is the barrel for holding the above mentioned optics, 23 the photographing optics and 24 the barrel for holding the above mentioned photographing optics, whereby on the lens barrels respectively a rack 22a and 24a is provided. 25 is a worm gear being provided on the shaft 26a of a motor 26 and engaged with the racks 22a and 24a on the lens barrels 22 and 24. Thus with the rotation of the motor 26 the above mentioned sharpness detecting optics 21 of the object image and the photographing optics 23 are simultaneously displaced along the same direction.

27 is a semipermeable mirror provided inclined behind the above mentioned optics 21, by means of which semipermeable mirror the light beam coming through the optics is divided into two beams. Rp and Rs are respectively the above mentioned parallel type member and the above mentioned series member. They are provided respectively on the focus plane of the sharpness detecting optics 21 of the object image or at a position corresponding thereto respectively at a position close thereto so as to receive the light beams divided by means of the above mentioned semipermeable mirror 27. Thus on the above mentioned members Rp and Rs the same object image is formed.

The permeability of the above mentioned semipermeable mirror 27 is preferably so chosen that the electrical characteristics of both members when an object image is formed are almost equal to each other according to the difference between the electrical characteristics of Rp and Rs for example, in the darkness or in the same illumination.

28 is the control circuit presenting the sharpness detecting circuit of the object image (whose representative examples are shown in FIGS. 5A to 5G), to which control circuit the above mentioned members Rp, Rs and the motor 26 are connected by means of conductors 29, 30 and 31.

F is a film placed on the focus plane of the photographing optics 23, 32 the openable member of the shutter placed in front of the above mentioned film and 33 the release button of the camera.

Figure 7:
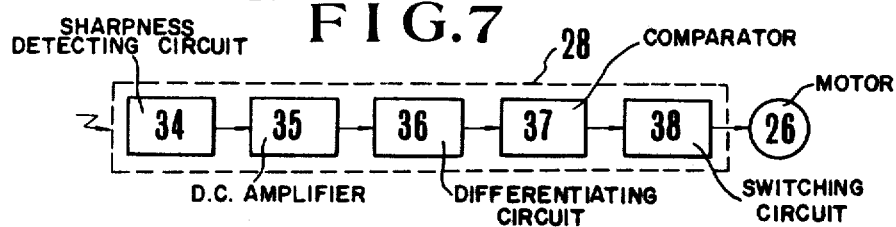
FIG. 7 shows a block diagram for showing the control circuit 28 of FIG. 6 in detail.

The composition of the above mentioned control circuit 28 is as shown in the block diagram of FIG. 7. Namely the control circuit 28 shown in broken line in FIG. 7 presents a sharpness detecting circuit 34 of the object image presenting a proper one of the circuits shown in FIG. 5A to 5G, a direct current amplifier 35, a differentiating circuit 36, a comparator 37 and a switching circuit 38 to the output of which switching circuit the above mentioned motor 26 is connected.

Figure 8:
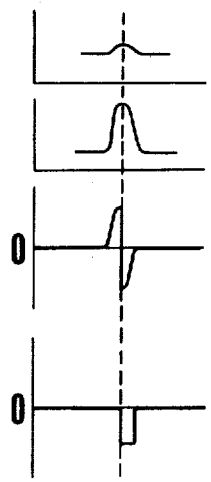
FIG. 8 shows the variation of the output at the parts 34, 35, 36 and 37 in the above mentioned control circuit 28 when the automatic focus adjusting system shown in FIG. 6 is in operation.

(a), (b), (c) and (d) of FIG. 8 respectively show the variation of the outputs of the part 34, 35, 36 and 37 in the above mentioned control circuit 28 when the above mentioned automatic focus adjusting system is in operation.

Below the operation of the above mentioned system will be explained.

When the photographer aims at the object to be photographed with the above mentioned system and pushes the two step release button down to the first step, the control circuit 28 is brought into the operation state and the motor 26 starts to rotate along a certain determined direction so as to displace the photographing optics 23 and the sharpness detecting optics 21 in a certain determined direction from the very close distance or the infinite distance. The variation of the outputs at the circuit blocks 34, 35, 36 and 37 of the control circuit 28 at this time is shown in (a) to (d) of FIG. 8.

The output of the sharpness detecting circuit 34 of the object image varies as shown in FIG. 8(a). Namely the output goes up or sinks down suddenly around the point at which the object image is most sharp. The variation of the output of the direct current amplifier 35 is as shown in FIG. 8(b), which is merely the amplified output of the circuit 34. The variation of the output of the differentiating circuit 36 is as is shown in FIG. 8(c), whereby the variation takes place in such a manner that the sign is reversed before and after the point at which the object image is most sharp whereby the electrical potential is at zero in a very short time at the point. In this embodiment the standard electrical potential of the comparator is set at zero and produces an impuls as is shown in FIG. 8(d) at the moment at which the output of the differentiating circuit 36 passes zero potential, in other words, at the moment at which the sharpness of the same object image formed on the members Rs and Rp by means of the optics 21 becomes maximum. (The sharpness of the object image formed on the film F by means of the photographing optics 23 is naturally maximum at this moment, too.) The pulse shown in FIG. 8(d) is given to the switching circuit 38 to bring the motor 26 instantly into the short circuited state and to stop the motor 26. Thus the photographer recognizes by means of a certain means that the optics 21 and 23 stand still and pushes the release button 33 down to the second step to operate the openable member 32 of the shutter and give a proper exposure to the film F.

Figure 9:
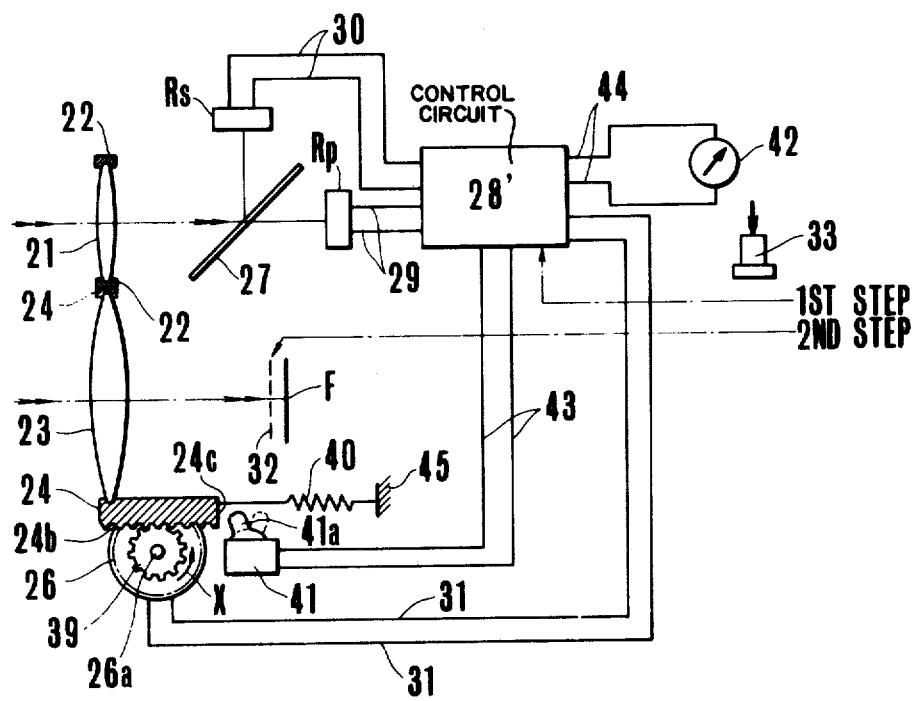
FIG. 9 shows the important part of the second embodiment of the automatic focus adjusting system for a camera basing upon the method for detecting the sharpness of the object image according to the present invention.

FIG. 9 shows the important part of the second embodiment of the automatic focus adjusting system for a camera basing upon the method for detecting the sharpness of the object image according to the present investigation. For the system of the present embodiment any circuit shown in FIGS. 5A to 5G can be adopted as the sharpness detecting circuit of the object image whereby the detecting circuit shown in FIG. 10 presents the circuit shown in FIG. 5F.

The members shown in FIG. 9 and having the same figures as those of the system shown in FIG. 6 present the same composition and the same function as those in FIG. 6 and therefore the explanations thereof are omitted here. What is to be noted here is only that the barrels 22 and 24 are directly connected on a part in such a manner that the sharpness detecting optics 21 of object image held by the barrel 22 and the photographing optics held by the barrel 24 can equally be displaced parallel to the optical axis in the same direction.

39 is the pinion which secured on the rotating shaft 26a of the motor 26 and engaged with the rack 24b provided on the barrel 24. 40 is a spring which is provided between the one end 24c of the barrel 24 and a part 45 of the camera body (not shown in the drawing) so as to attract the lens barrel 24 to the right in FIG. 9. 41 is the switch box of the switch whose movable arm 41a is normally set at a position shown in full line in the travelling path of the end 24c of the lens barrel in FIG. 9 and set at a position shown in broken line only when the arm 41a strikes at the end 11' of the lens barrel 11 and which serves to automatically set the operation condition of the sharpness detecting circuit of the object image and to start the operation of the generating circuit of saw tooth shaped waves and is connected with the control circuit 28' by means of a conductor 43. 42 is the object distance indicating instrument which is connected with the control circuit 28' by means of a conductor 44.

Figure 10:
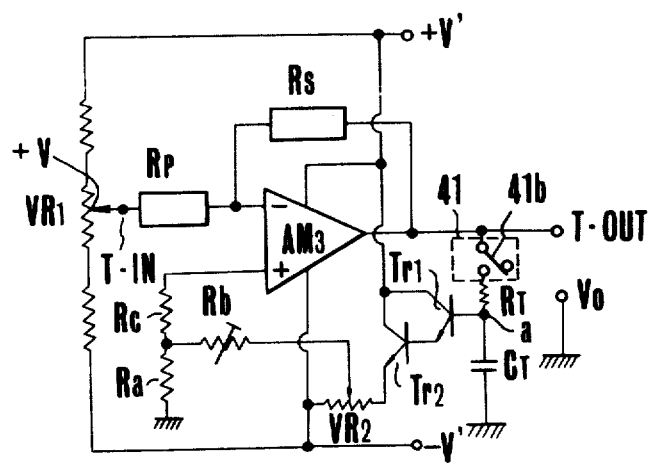
FIG. 10 shows a concrete circuit of the sharpness detecting circuit of the object image applied in the apparatus shown in FIG. 9.

The series type member Rs and the parallel type member Rp in FIG. 9 are respectively connected with the feedback circuit and the input circuit of the operation amplifier $AM_3$ as is shown in FIG. 10. Therefore, as is already stated in the explanation of the circuit shown in FIG. 5F the output $V_o$ is expressed by means of the following equation in regard to the imput $+V$ of the above mentioned operation amplifier $AM_3$ $$V_o = -\frac{Rs}{Rp} V$$

so that the output $V_o$ becomes maximum when the sharpness of the object image formed on the members Rs and Rp is highest. The sharpness detecting circuit of the object image shown in FIG. 10 is capable of delicately detecting the sharpness of any object image, whereby as is shown in FIGS. 1A and 1B or FIGS. 4A and 4B the constructions of the photoelectric semiconductors and of the electrodes composing the series type member and those composing the parallel type member are remarkably different from each other in such a manner that their electrical characteristics, especially their resistance values are very different from each other even when both members are exposed to the light beam with the same illumination. Also when the illuminations are different from each other, it is unavoidable that the difference is produced in the electrical characteristics due to the difference of the $\gamma$ values or the K values shown in the equation (1). Therefore the output corresponding to the above mentioned difference is produced even when the sharpness of the object image formed on the members is low. Such an output is clearly independent of the sharpness of the object image and acts as noises for the detection of the sharpness of the object image.

In the system of the present embodiment, in order to avoid the above mentioned bad influence, an output level detecting circuit consisting of a resistance $R_T$ and a condensor $C_T$ and a balance setting circuit are connected with the sharpness detecting circuit of the object image as is shown in FIG. 10, whereby the balance setting circuit is so composed that the output of an amplifier consisting of two transistors $Tr_1$, $Tr_2$ with high input impedance is earthed to form an emitter follower in such a manner that the off-set voltage decided by the resistances Ra, Rb and the variable resistance $VR_2$ is varied according to the output of the emitter follower and is supplied to the operation amplifier $AM_3$ through a compensation resistance Rc and further the contact 41 in mechanical engagement with the movable arm 41a of the switch box 41 shown in FIG. 9 is connected with the above mentioned balance setting circuit as is shown in the drawing in such a manner that the automatic setting of the operation condition of the sharpness detecting circuit of the object image is enabled while the above mentioned noise output is eliminated. Hereby $VR_1$ is a variable resistance for setting the input $+V$ of the operation amplifier $AM_3$. The positions of the contact 41 shown in full line and in broken line in FIG. 10 correspond to the positions of the movable arm 41a shown in full line and in broken line in FIG. 9.

When the main switch not shown in the drawing, for the system in FIG. 9 is opened, the sharpness detecting optics 21 of the object image and the photographing optics 23 are set at the right end position in the drawing by means of the spring 40 in such a manner that the movable arm 41a of the switch box 41 is set in a position shown in broken line in the drawing so that the contact 41b in mechanical engagement with the movable arm 41a is connected with one end of the resistance $R_T$ as is shown in broken line in FIG. 10.

The moving field of the above mentioned both optics is usual so determined that the image of the object existing between a very close distance and the infinite distance is formed sharply on the film F, while in the system of the present embodiment the above mentioned both optics are so designed as to be capable of been retired beyond the moving field, so that the sharpness of the object image formed on the members in this state is remarkably low and the output of the members corresponds to the brightness of the object and not to the sharpness of the object image. In consequence the output $V_o$ of the operation amplifier $AM_3$ assumes a value determined by the brightness of the object and the characteristics of the members. This output charges the condensor $C_T$ the resistance $R_T$ so that the electrical potential at the point a, namely the input of the above mentioned balance setting circuit assumes a value corresponding to the above mentioned noise output. The output of this balance setting circuit is connected to the input terminal of the operation amplifier $AM_3$ on the one hand and to the compensation resistance on the other hand. Hereby the characteristics of the above mentioned balance setting circuit is supposed to be designed so as to compensate the influence of the noise output, giveing the off-set voltage (or current) of the operation amplifier according to the input of the circuit, namely the above mentioned noise output. It is clear that the output $V_o$ in the sharpness detecting circuit of the object image presenting such a circuit as mentioned above does not contain the above mentioned noise output any more. When the above mentioned optics travels in the usual travelling field, being driven by the motor 26, the movable arm 41a of the switch box is brought in the position shown in full line in FIG. 9 in such a manner that the contact 41b is set at the position shown in full line in FIG. 10 so that the electrical potential at the point a is kept by means of the condensor $C_T$, a proper off-set voltage (or current) is continuously given to the operation amplifier $AM_3$ and the operation condition of the sharpness detecting circuit of the object image is kept to be automatically set.

Figure 11:
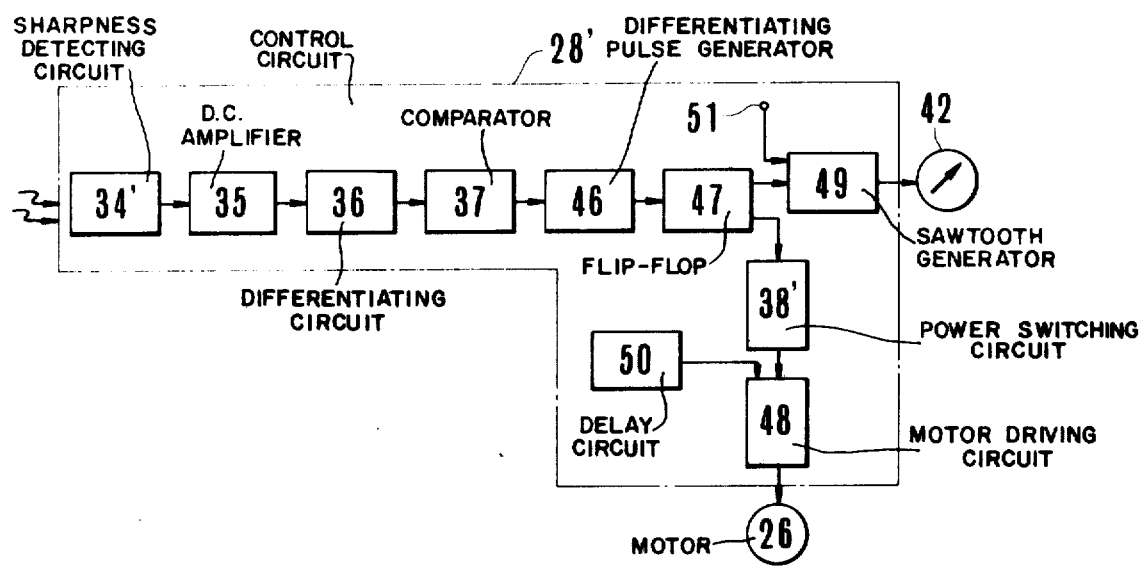
FIG. 11 shows a block diagram showing the signal processing parts in the control circuit 28' of the apparatus shown in FIG. 9.

FIG. 11 shows a block diagram showing the signal processing part in the above mentioned control circuit 28', whereby 34' is a sharpness detecting circuit as is shown in FIG. 10 and 35, 36 and 37 are respectively a direct current amplifier, a differentiating circuit and a comparator similar to those in the control circuit 28 of the system shown in FIG. 6. 46 is a differentiating pulse generator, 47 a flip-flop circuit, 38' a power switching circuit, 48 a motor driving circuit, 49 a saw tooth shaped wave generator, whereby the above mentioned motor 26 is connected to the output of the motor driving circuit 48 while the distance indication instrument 42 is connected to the output of the saw tooth shaped wave generator 49. 50 is a delay circuit and 51 a terminal at which the starting signal coming from the above mentioned switch box 41 enters into the saw tooth shaped wave generator 49.

Figure 17:
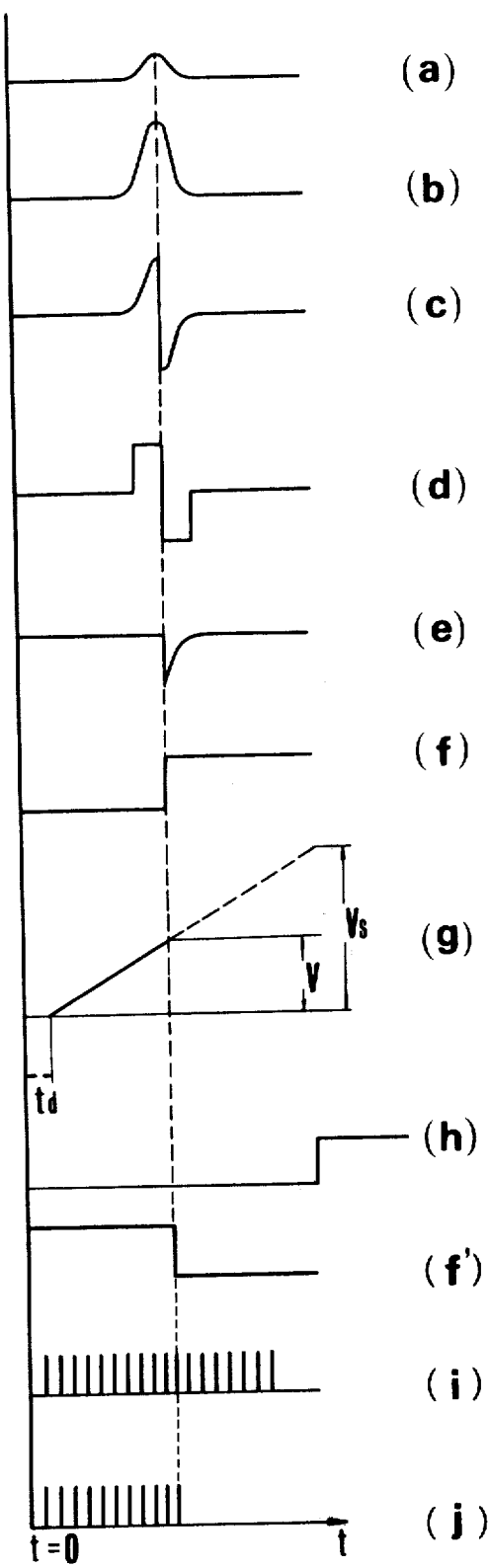
FIG. 17 shows the variation of the outputs at the parts 34', 34'', 35, 36, 37, 46, 47, 61, 52 and 53 in the control circuits 28', 28'' and 28''' shown in FIGS. 11, 12, 14 and 16 when the automatic focus adjusting system is in operation.

The variations of the output of the circuit parts 34', 35, 36, 37, 46, 47 and 49 in the above mentioned circuit 28' driving the operation of the above mentioned system are respectively shown in (a), (b), (c), (d), (e), (f) and (g) of FIG. 17 whereby the abscissa shows the time starting from the operation of the release button ($t = 0$).

The operation of this system will be explained below.

When the photographer pushes the two step release button 33 down to the first step, after aiming at the object to be photographed with this system, all the circuit parts of the control circuit 28' excepting the saw tooth shaped wave generating circuit 49 and the motor driving circuit 48 are brought into the state ready for operation by means of a switch not shown in the drawing. Hereby the flip-flop circuit 47 is supposed to be in the switched off state. At this time, the balance setting circuit connected to the operation amplifier $AM_3$ as is shown in FIG. 10 starts to operate in such a manner that, as already explained in detail, a proper off-set voltage (or current) is given to the operation amplifier $AM_3$ so as to eliminate the noise output corresponding to the brightness of the object image formed on the photoelectric members Rs and Rp. After a certain determined time $t_d$ set in the delay circuit 50, the motor driving circuit 48 is brought in the switched on state by means of the output of the above mentioned delay circuit 50 so that the motor 26 starts to rotate along the direction X in FIG. 9 in such a manner that the simultaneous advance movement (to the left in FIG. 9) of the optics 21 and 23 is started by means of the pinion 39 secured on the shaft 26a of the above mentioned motor 26 and the rack 24b in engagement of the pinion 39, provided on the lens barrel 24. According as the optics 21 and 23 advances, the movable arm 41a of the switch box 41 in FIG. 9 is brought into the position shown in full line in FIG. 9 so that the contact 41b in FIG. 10 opens the circuit (set at the position shown in full line in FIG. 10) while the electrical potential at the point a in the circuit in FIG. 10 is kept by means of the condensor $C_T$ in such a manner that the operation condition of the sharpness detecting circuit of object image is kept to be automatically set. Further at this time by means of the switching over operation of the not shown switch means provided, similarly to the above mentioned contact 41b, so as to be in functional engagement with the movable arm 41a of the switch box, a signal for starting the generation of the saw tooth shaped waves is generated by an already known signal generating means not shown in the drawing and sent to the saw tooth shaped wave generating circuit 49 through the terminal 51 in FIG. 11 so that the above mentioned circuit 49 is brought in operation in such a manner that a linear signal with a certain determined rate and $t_d$ due to the delay circuit 50 as shown in FIG. 17(g) is produced in a repeated manner.

Hereby the delay time of the delay circuit must be set longer than the time during which the circuit part for setting the operation condition of the above mentioned operation amplifier $AM_3$ is operated and the charge corresponding to the noise output is loaded in the condensor $C_T$.

The sharpness of the object image formed on the members Rs and Rp is varied in accordance with the advance of the optics 21 and 23 so that the output of the sharpness detecting circuit 34' is varied as is shown in FIG. 17(a). Hereby it goes without saying that the top of this output wave corresponds to the point at which the sharpness of the object image is sharpest. The output of the above mentioned detecting circuit 34' is amplified, as is shown in FIG. 17(b) by means of the direct current amplifier 35 so as to be treated easily later and then sent to the differentiating circuit 36, in which the output is converted into a signal whose sign is reversed before and behind the point at which the sharpness of the object image is highest and zero at the point for a very short time. The output of this differentiating circuit 36 is put in the comparator 37 in which the point at which the differentiated output (FIG. 17(c) ) varies abruptly, namely the point at which the sharpness of the object image is highest is detected and then put in the differentiated pulse generator 46 in such a manner that a differentiated pulse is generated at the point at which the sharpness of the object image is highest. The output of the comparator 37 and that of the differentiated pulse generator 46 are respectively shown in FIG.d 17(d) and (e). The differentiated pulse (FIG. 17 (e) ) is then put in the flip-flop circuit 47, so as to bring the circuit in the switched on state. The output of the flip-flop circuit 47 is as is shown in FIG. 17(f) and given to the saw tooth shaped wave generating circuit 49 and the power-switching circuit 38'.

By means of the output of the flip-flop circuit 47, in the saw tooth shaped wave generating circuit 49 the rise of the output which is raised at a constant speed as is shown in FIG. 17(g) is stopped in such a manner that the output is kept at V. The output V which is the output whose rise is stopped in the saw tooth shaped wave generating circuit 49 is given to the indication instrument 42 so as to be indicated as the distance of the object.

On the other hand, by means of the output of the flip-flop 47, the power switching circuit 38 is brought in the non-operation state instantly or makes both terminals of the motor 26 short circuited so as to be stopped in a very short time.

Hereby the sharpness detecting optics 21 of the object image and the photographing optics 23 are set at the position at which the object image is formed on the film plane most sharply, whereby the automatic focussing adjustment is completely. Then by pushing the release button 23 down to the second step, the shutter opening member 32 is operated as already known so as to give a proper exposure to the film F, whereby the photographing is completed. When the release button 33 is no more pushed, all the operation of the system is released by means of the opening of a not shown switch, when by means of the spring 40 the above mentioned optics 21 and 23 are retired up to their initial positions (right end position in FIG. 9) and the movable arm 41a, of the switch box 41 is brought in the position shown in broken line in FIG. 9, so that the contact 41b in FIG. 10 comes again in contact with the one end of the resistance $R_T$.

Figure 12:
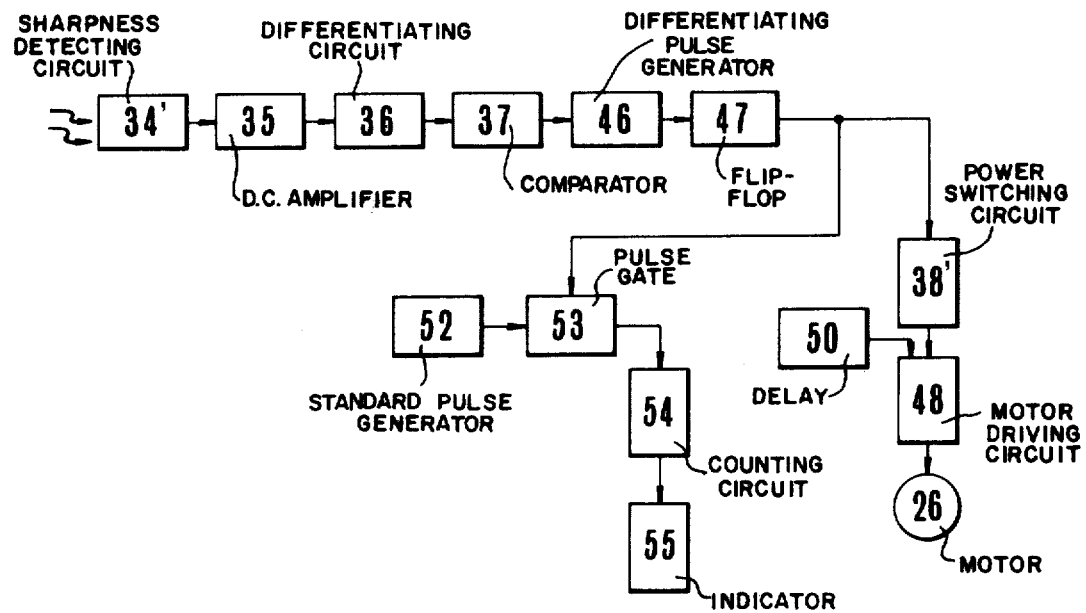
FIG. 12 shows a block diagram showing an apparatus of the above mentioned control circuit in the system shown in FIG. 9, whereby a digital indication device is adopted instead of the distance indication instrument 42 of the object.

FIG. 12 shows a block diagram showing an embodiment of the above mentioned control circuit in the system shown in FIG. 9 whereby a digital indication instrument is adopted instead of the distance indication instrument 42 of the object. The circuit parts shown in FIG. 12 and presenting the same figures to those in the control circuit 28' in FIG. 11 have the same functions to those in FIG. 11. 47' is a flip-flop circuit with the same composition to that of the flip-flop circuit 47 in FIG. 11, whereby contrary to the flip-flop circuit 47, the present flip-flop circuit is set in such a manner that as is shown in FIG. 17(f'), it remains in the switched on state in the initial state and is brought in the switched off state by means of the differentiated pulse (FIG. 17(e)) coming from the differentiated pulse generator 46 when the sharpness of the object image is sharpest. 52 is the standard pulse generator, 53 the pulse gate circuit, 54 the counting circuit and 55 the digital indication instrument.

During the operation, the output of the flip-flop circuit 47' (FIG. 17(f')) is put in the pulse gate circuit 53 whereby the circuit 53 is closed when the circuit 47' is brought in the switched off state. The pulse gate circuit 53 allows the standard pulse shown in FIG. 17(i) produced by the standard pulse generator 52 to pass through when the circuit 53 is in the opened state. Therefore, as is shown in FIG. 17(j) the standard pulses are put in the counting circuit 54 until the flip-flop circuit 47' is brought in the switched off state, during which the number of the put in pulses are counted by means of the counting circuit 54 and indicated in the indication instrument 55 digitally.

The operations of other circuit parts being same as those of the above mentioned case, they are omitted to be explained here.

Figure 13:
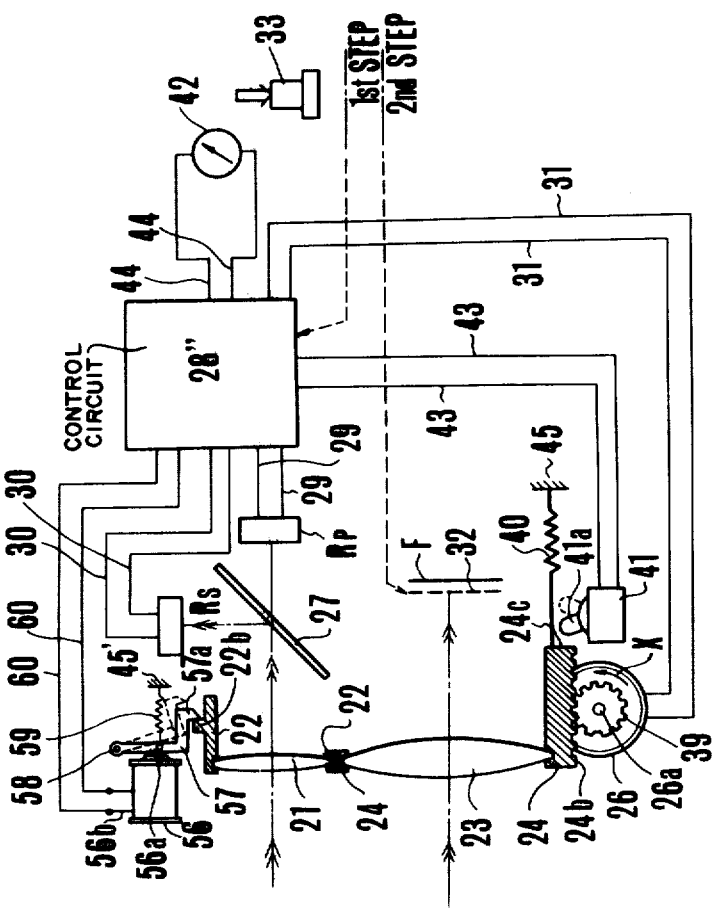
FIG. 13 shows the important disposition of the third embodiment presenting an automatic focus adjusting system basing upon the method for detecting the sharpness of the object image according to the present invention.

FIG. 13 shows the important disposition of the third embodiment presenting an automatic focus adjusting system basing upon the method for detecting the sharpness of the object image according to the present invention. In this third system also the embodiment of the circuit shown in FIG. 10 is supposed to be used as the sharpness detecting circuit of the object image as is in case of the above mentioned second system (FIG. 9). Therefore, similarly to the previous embodiment the operation condition of the sharpness detecting circuit of the object image is automatically set during the operation of the system. The dispositions and the functions of the members in FIG. 13 with the same figures to those in the systems shown in FIGS. 6 and 9 being same to those in FIGS. 6 and 9, they are omitted to the explained again.

The improvement of the present system lies in the fact that the system presents a mechanism by means of which the photographic optics is automatically set, for example, at the position corresponding to the overfocus distance when the sharpness of the object image can not be detected, for example, when the brightness of the object is remarkably low or when the object has almost the same brightness all over the surface and the contrast is extremely low.

First of all the disposition of the overfocus distance setting mechanism will be explained.

In FIG. 13, 56 is an electro-magnet consisting of an armature 56a with the exciting winding 56b wound around it, whereby the winding 56b is connected with the control circuit 28'' through the conductor 60. 57 is a stop lever presenting a claw 57a and being rotatably born on the pin 58 provided on a part of the camera body not shown in the drawing, whereby the stop lever is pushed around the above mentioned pin 58 counter clockwise in the drawing by means of a spring 59 provided between the stop lever and a part 45' of the camera body. The claw 57a of the stop lever 57 is engageable with the projection 22b provided on a part of the barrel 22 for holding the sharpness detecting optics 21 of the object image, whereby the operation of the above mentioned claw 57a is controlled by means of the above mentioned electro-magnet 56. Namely, the stop lever 57 remains in the state shown in the broken line in FIG. 13 when the electro-magnet 56 is not in the excited state, while it is attracted by means of the armature 56a so as to be rotated clockwise around the pin 58 against the strength of the spring 59 in such a manner that the claw 57a is brought in the movement path of the projection 22b of the barrel 22 as is shown in full line in FIG. 13.

Figure 14:
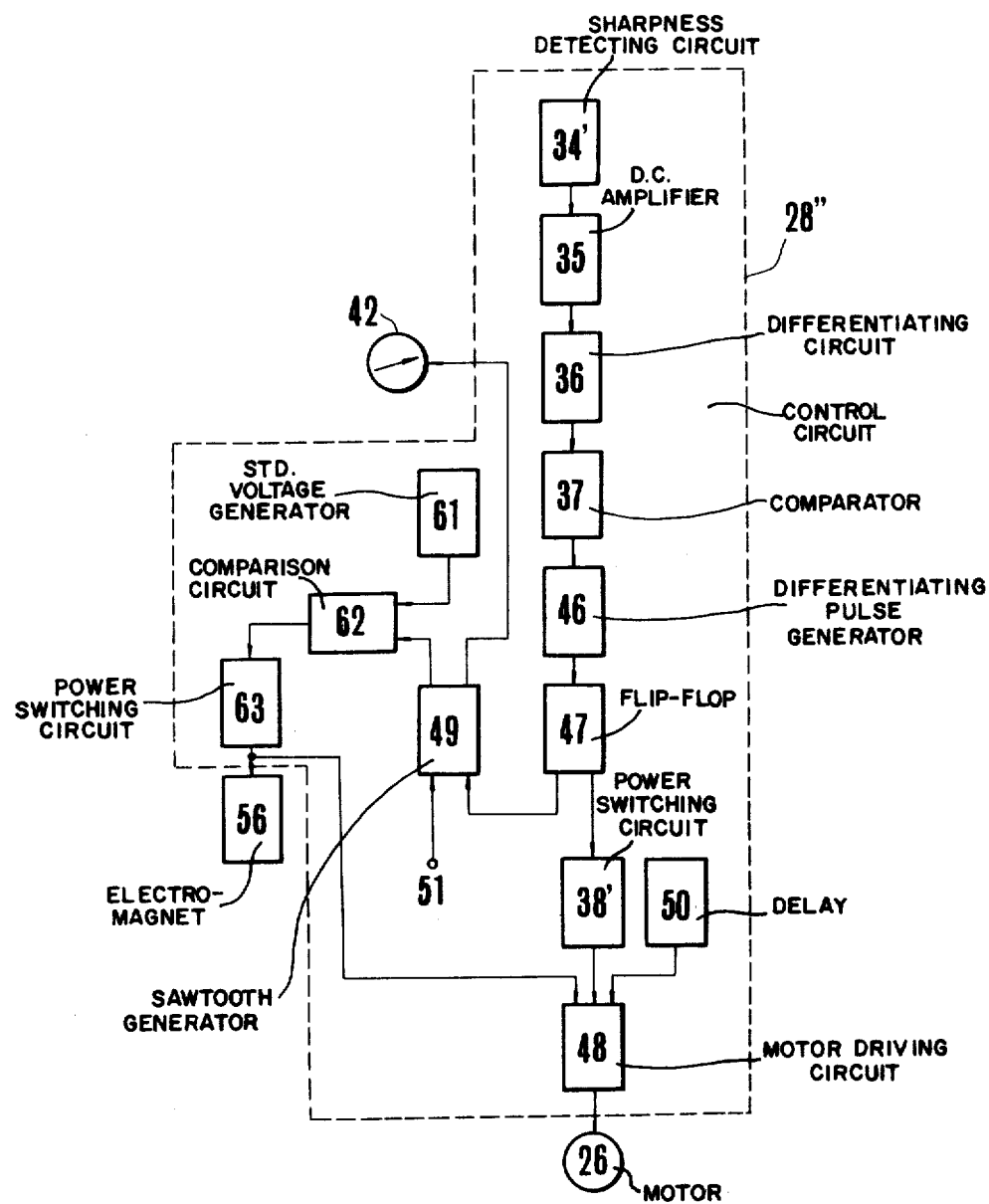
FIG. 14 shows a block diagram of the signal processing parts in the control circuit 28" of the system shown in FIG. 13.

The signal processing circuit parts in the control circuit 28'' are as shown in FIG. 14. The circuit parts shown FIG. 14 and presenting the same figures as those in the control circuits 28 respectively 28' shown in FIGS. 7 and 11 are same as those of FIGS. 7 and 11 while the variation of the output signals of the circuit parts during the operation of the system are as shown in FIGS. 17(a) to (g) similarly to the same of the control circuit 28' in FIG. 11, so that their explanation is omitted.

In FIG. 14, 61 is the standard voltage generating circuit and always produces a certain determined voltage Vs shown in the output diagram of the saw tooth shaped wave generating circuit 49 in FIG. 17(g) (this voltage Vs is determined, for example corresponding to the most advanced position of the optics 21, 23). 62 is a comparison circuit for example, such as a Schmittrigger circuit, which produces a certain determined signal as shown in FIG. 17(h) at the time, when the output voltage of the saw tooth shaped wave generating circuit 49 exceeds the output voltage Vs of the standard voltage generating circuit 61. 63 is the power switching circuit which switches on and off the electro-magnet 56 according to the output of the comparison circuit 62.

Below the operation of the present system will be explained. The operation when the output at the point at which the sharpness of the object image is highest is clearly and correctly is similar to the case of the system shown in FIG. 9, so that only the operation when the point at which the sharpness of the object image is highest will be explained. (In case the point at which the sharpness of the object image is highest can be obtained, the output voltage of the saw tooth shaped wave generating circuit 49 does not exceed Vs, so that the overfocus position setting mechanism of the photographing optics is never operated.)

In case the point at which the sharpness of the object image is highest can not be detected during the movement of the optics 21, 23, the differentiated pulse generator 46 does not produce a clear as is shown in FIG.

17(e), so that the flip-flop circuit 47 is kept in the switched off state and the motor 14 continues to rotates so as to produce the saw tooth shaped waves. In consequence the output of the saw tooth shaped wave generating circuit 49 continues to rise as is shown in the broken line in FIG. 17 (g) until the output reaches a certain determined voltage Vs set in the standard voltage generating circuit 61 and determined so as to correspond to the most advanced position of the optics.

At this time, the comparison circuit 62 sends a signal as shown in FIG. 17(h) to the power switching circuit 63 as explained before. Thus the power switching circuit 63 excites the electro-magnet 56, stopping at the same time the operation of the motor driving circuit 48. Thus, the stop lever shown in FIG. 13 is set at the position shown in full line in the drawing while the optics are retired by means of the strength of the spring 40 so that the projection 22b formed on the lens barrel 22 engages with the claw 57a of the stop lever 57 and the optics are kept at the position temporarily. The position at which the optics are kept is the one determined so as to correspond to the overfocus distance of the photographing optics 23 as explained above, so that an almost clear image of the object can be photographed by pushing the release button 33 down to the second step.

When the release button 33 is no more pushed down, all the operations of the system are released in such a manner that the optics 21, 23 are retired to the initial position by means of the function of the spring 40 (the right end position in FIG. 13).

Below the fourth embodiment consisting of the automatic focus adjusting system suited for the camera basing upon the method for detecting the sharpness of the object image according to the present invention will be explained.

Figure 15:
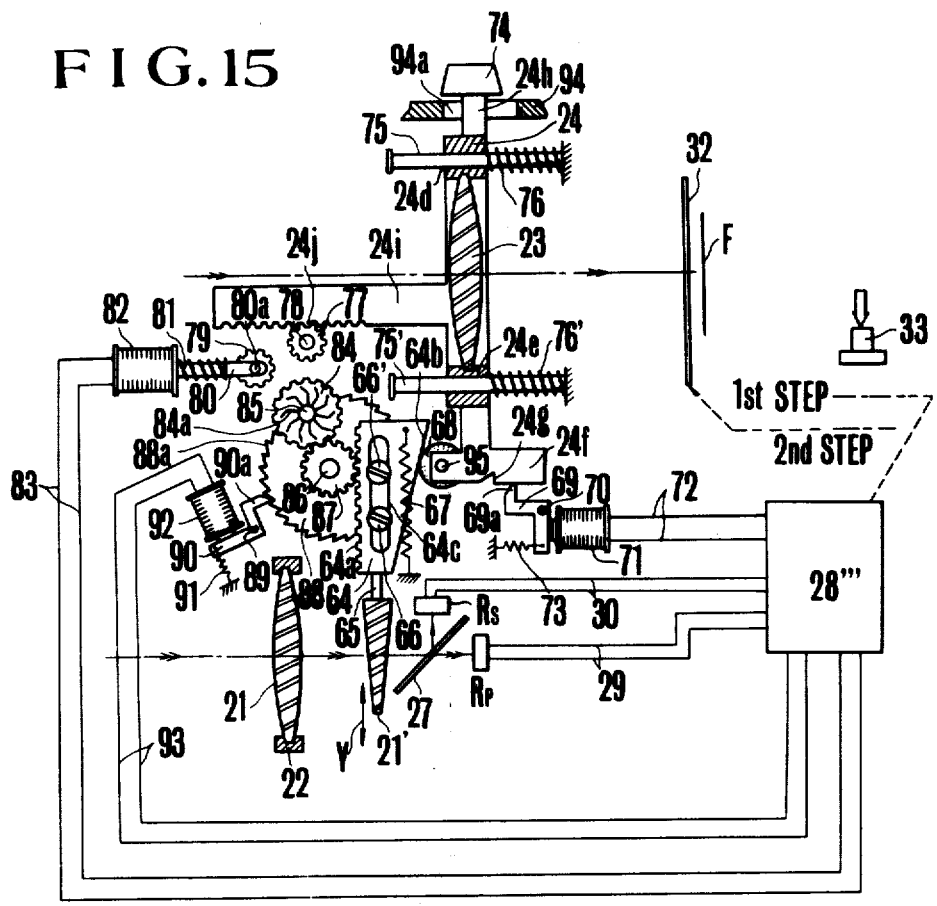
FIG. 15 shows the important disposition of the fourth embodiment presenting an automatic focus adjusting system basing upon the method for detecting the sharpness of the object image according to the present invention.
Figure 16:
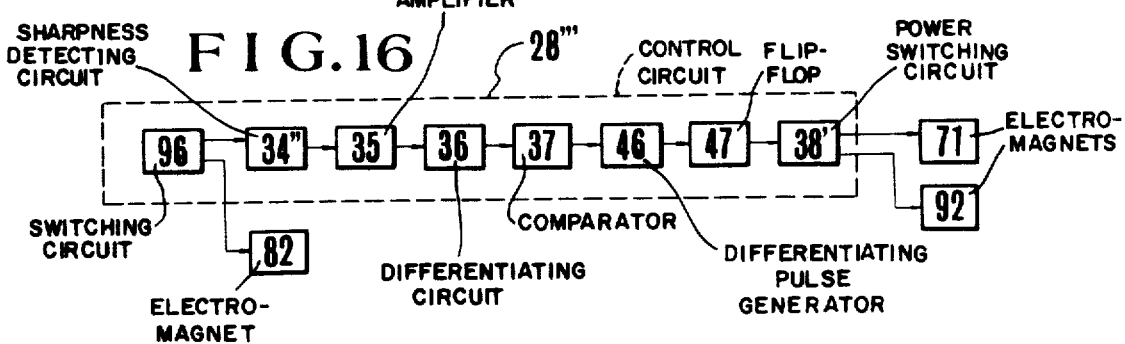
FIG. 16 shows a block diagram showing the control circuit 28''' in the system shown in FIG. 15.

FIG. 15 shows the important part of this system while FIG. 16 shows the disposition of the control circuit 28''' of this system. As the sharpness detecting circuit of the object image to be adopted in the present system any one shown in FIGS. 5A to 5G will do, whereby the circuit shown in FIG. 5F is adopted. The dispositions and the functions of the system shown in FIG. 15 presenting the same figures as those of the above mentioned three systems and the dispositions and the functions of the circuit parts in the control circuit 28' shown in FIG. 15 presenting the same figures as those of the above mentioned three systems are equal to those of the above mentioned three systems, so that their explanation is omitted here. Hereby in the present system the sharpness detecting optics 21 of the object image is fixed while only the photographing optics is movable along the optical axis for forcus adjustment.

In FIG. 15, 21' is an optics being supported on the slidable member 64 through the connecting rod 65. In the slidable member 64, a guide slot 64c is provided, in which the guide pins 66, 66' provided on the camera body not shown engage in such a manner that the slidable member 64 is slidable upwards and downwards in FIG. 15, whereby with the slide movement of this slidable member 64, the optical key 21' is brought into or out of the light beam path of the optics 21 along the direction Y in the drawing so as to alter the sharpness of the object image formed on the members Rs, Rp.

The slidable member 64 is forced downwards in the drawing by means of a spring 67, which is fixed on the camera with the one end whereby on the one side of the slidable member 64 a rack 64a is formed for engaging with the pinion 87 provided rotatable around the shaft 86 fixed on the camera body while on the other side a cam face 64b is formed.

On the barrel 24, holding the photographing optics 23 guide holes 24d, 24e are formed through which the guide rods 75, 75' fixed on the camera body are inserted in such a manner that the photographing optics 23 can be advanced and retired along the optical axis. 76 and 76' are the springs provided between the barrel 24 and the camera body so as to force the barrel 24 to the left in the drawing. 68 is the cam follower rotatably born by the pin 95 provided on the first projecting arm of the barrel 24 and can be brought in contact with the cam face 64b of the slidable member 64. Thus the advance of the photographing optics 23 depends upon the vertical position of the slidable member 64 in the drawing.

69 is the first stopping lever rotatably born by a pin 70 provided on the camera body and forced clockwise around the pin 70 by means of the spring 73, presents a claw 69a engageable with the notch 24g formed on a part of the first projecting arm 24f of the barrel 23 and serves to keep the optics 23 at the initial position for advancement. 71 is the first electro-magnet for releasing the stopping operation of the first stopping lever toward the barrel 24 and connected with the control circuit 28''' by means of the conductor 72.

88 is a ratchet wheel making one body with the above mentioned pinion and presenting a claw 88a which engages with the stopping claw 90a of the second stopping lever 90 rotatably born by the pin 89 provided on the camera body and forced counter clockwise in the drawing around the pin 89. 92 is the second electromagnet for controlling the engagement of the stopping claw 90a of the stopping lever 90 with the claw 88a of the ratchet wheel 88 and is connected with the control circuit 28''' by means of the conductor 93. 84 is a wing wheel rotatably born by the shaft fixed on the camera body and engageable with the pinion 87 and presents wings 84a for speed control. 77 is a pinion rotatably born by the shaft 78 fixed on the camera body and engageable with the rack 24j formed on a part of the second projecting arm 24i of the barrel 24. 79 is a pinion rotatably born by the pin 80a fixed on the actuater 80 of the third electro-magnet 82 which is connected with the control circuit 28''' by means of a conductor 83 while 81 is a spring forcing the actuater 80 to the right in the drawing. Thus when the third electro-magnet 82 is in the non excited state, actuater 80 is advanced to the right in the drawing by means of the strength of the spring 81 in such a manner that the pinion 78 engages with the pinion 77 and the wing wheel 84 in such a manner that the pinion 77 and the wing wheel 84 are in functional engagement with each other.

74 is an operation nob provided on the prolongation 24th projecting through the hole 94a of the cover 94 of the camera, of the barrel 24 and allows the photographing optics 23 to be retired to the initial position for advance manually.

In the control circuit 28'' in FIG. 16, 96 is the switching circuit and 34'' the sharpness detecting circuit of the object image basing upon the circuit disposition shown in FIG. 5F. The variations of the outputs of the circuit parts 34'', 35, 36, 37, 46 and 47 in the control circuit 28''' during the operation of the system are shown respectively in (a), (b), (c), (d), (e) and (f) in FIG. 17 as in case of the afore mentioned system.

Hereby at the start of the operation of the system the first, the second and the third electromagnet 71, 92 and 82 are all in the non-excited state so that the stopping claw 69a of the first stopping lever 69 engages in the notch 24g of the barrel so as to keep the photographing optics at the initial position for advance whereby the stopping claw 90a of the second stopping lever 90 is out of engagement with the claw 88a of the ratchet wheel 88 while the pinion 79 is in engagement with the pinion 77 and the wing wheel 84. Further the optical key 21' is kept at the uppermost position in the drawings.

Below the operation of the above mentioned system will be explained in detail.

When the photographer aims at the object with the present system and pushes the two step release button down to the first step, at first the switching circuit 96 in the conrol circuit 28''' starts to operate so as to bring the sharpness detecting circuit 34'' of the object image into operation and to excite the third electromagnet 82. Thus the engagement of the pinion 77 with the wing wheel is released in such a manner that the optical key 21' starts to move downwards by means of the strength of the spring 67. Hereby the wings 84a of the wing wheel 84 serves to control the speed. According to the movement of the optical key 21', the sharpness of the object image formed on the series type member Rs and the parallel type member Rp varies until the sharpest object image is obtained, when the flip-flop circuit 47 in the control circuit 28''' is brought out of the switched off state into the switched in state as is shown in FIG. 17(f) so that the first and the second electro-magnet 71 and 92 are excited. When the second electro-magnet 92 is excited, the second stopping lever 90 is rotated clockwise around the pin 89 against the strength of the spring until the stopping claw 90a of the second stopping lever 90 engages with the claw 88a so that the ratchet wheel 88 ceases the rotation and the downward movement of the slidable member 64 and of the optical key 21 stops.

When on the other hand the electro-magnet 71 is excited the first stopping lever 69 is rotated counter clockwise around the pin 70 in such a manner that the engagement of the stopping claw 69a of the first stopping lever 69 in the notch 24g of the barrel 24 is released so that the photographing optics 23 is advanced to the left in FIG. 15 by means of the strength of the springs 76, 76' until the cam follower 68 provided on the barrel 24 strikes the cam face 64b of the slidable member 64. Hereby the cam face 64b of the slidable member 64 is so designed that the photographing optics 23 forms the sharpest object image on the film F according to the position at which the optical key 21' stops. Thus the focus adjusting operation of the photographing optics 23 is completed.

When at this time, the release button 33 is pushed down to the second step, the shutter opening member 32 is operated as is already known so as to complete the photographing.

When the release button 33 is no more pushed, the first, the second and the third electro magnet 71, 92 and 82 are all no more excited so that the first and the second stopping lever 69 and 90 are released in such a manner that the pinion 79 engages with the pinion 77 and the wing wheel 84.

When after releasing the release button 33, the operation nob 74 is moved manually to the right in FIG. 15, the photographing optics 23 is retired up to the determined initial position for advance while the slidable member 64 is raised upwards in the drawing by means of the connection of the rack 24j, the pinion 77, the pinion 79, the wing wheel 84, the pinion 86 and the rack 64a whereby the initial state for operation is established at the time when the barrel is stopped by means of the first stopping lever 69.

What we claimed is:

1. An object distance measuring system comprising:
   A. an image forming optical system capable of forming an image of an object, the optical system having an optical axis and being arranged to be shiftable along the axis from a predetermined first position on the axis to a second position in which the image of the object is placed on a destined image forming plane;
   B. driving means for driving said optical system from said first position toward said second position, the driving means being operatively connected to said optical system;
   C. detecting means for detecting the positional variation of said optical system on the optical axis, said detecting means being responsive to the positional variation of the optical system and producing a signal for stopping the optical system when the optical system reaches the second position, said driving means being electrically connected to said detecting means and stopping the shifting of said optical system in response to said signal produced by said detecting means;
   D. converting means for converting a shifting distance of said optical system in moving from the first position to the second position, into a digital signal, the converting means producing a digital signal corresponding to the shifting distance of the optical system from the first position in relation to the shifting of the optical system; and
   E. displaying means for digitally displaying the object distance said displaying means responsive to the digital output signal of said converting means to digitally display said object distance based on the digital signal which is produced by the converting means and which corresponds to the shifting distance of the optical system.

2. An object distance measuring system according to claim 1, wherein said converting means includes:
   electrical circuit means which detects the shifting distance of said optical system from the first position to the second position by measuring the time required for shifting, the circuit means producing a digital signal corresponding to the shifting distance of the optical system, said displaying means being electrically connected to said circuit means to digitally display the distance to the object based on the output of said circuit means.

3. An object distance measuring system according to claim 2, further comprising:
   actuating means for causing said driving means to start, the actuating means being operatively connected to the driving means; said electrical circuit means being responsive to said actuating means and to said signal produced by said detecting means, and operating in such a manner as to commence the measuring of the time required for shifting of said optical system from said first position to said second position almost synchronously with the start of the shifting of the optical system and to discontinue the measuring of the time in response to the signal produced by the detecting means.

4. An object distance measuring system comprising:
   A. an image forming optical system capable of forming an image of an object, the optical system having an optical axis and being arranged to be shiftable along the axis from a predetermined first position on the axis to a second position in which the image of the object is placed on a destined image forming plane;

B. driving means for driving said optical system from the first position toward said second position along the optical axis at a constant speed, the driving means being operatively connected to the optical system;

C. actuating means for causing said driving means to start, the actuating means being operatively connected to the driving means;

D. converting means for converting a shifting distance of said optical system in moving from the first position to the second position into a digital signal, the converting means including:

D-1. responsive means which responds to the positional variation of said optical system on the optical axis, the responsive means detecting the positional variation of the optical system and producing a control signal when the optical system reaches the second position;

D-2. pulse output means which produces preset timing pulses at given time intervals, the pulse output means being responsive to said actuating means and being electrically connected to said responsive means, and operating in such a manner as to commence the output of said pulses almost synchronously with the start of said driving means and to discontinue the output of said pulses in response to the control signal produced by said responsive means; and D-3. pulse counting means which is electrically connected to said pulse output means to produce said digital signal corresponding to the shifting distance of said optical system by counting the number of pulses produced by the pulse output means; and E. displaying means for digitally displying the object distance, the displaying means being responsive to the digital output signal of said converting means to digitally display said object distance based on the digital signal which is produced by the converting means and which corresponds to the shifting distance of the optical system.

5. An object distance measuring system according to claim 4, wherein said pulse output means includes:

pulse generating means which generates said preset timing pulses at said preset time intervals; and gate circuit means which controls the transmission of the pulses generated by said pulse generating means, the gate circuit means being responsive to said actuating means and being electrically connected to said responsive means and to said pulse generating means and operating in such a manner as to commence of the transmission of said pulses almost synchronously with the start of said driving means and to stop the transmission of the pulses in response to the control signal produced by said responsive means, said pulse counting means, being electrically connected to said gate circuit means, and counting the number of pulses transmitted through said gate circuit means.

6. An object distance measuring system according to claim 5, wherein said gate circuit means includes gate means electrically connected to said pulse generating means, the gate means being switchable between a first state in which the gate means allows the passage of the pulses generated by the pulse generating means and a second state in which the gate means prohibits the passage of said pulses; and gate control means which controls the switching of said gate means, said gate controlling means being and is responsive to said actuating means and being electrically connected to said responsive means and to said gate means so as to operate in such a manner as to set the gate means in the first state almost synchronously with the start of said driving means and to switch the gate means to the second state in response to the control preset signal produced by said responsive means, said counting means, being electrically connected to said gate means and counting the number of pulses transmitted through the gate means.

7. An object distance measuring system according to claim 6, wherein said responsive means includes:

photoelectric transducing means which is virtually disposed on said destined image forming plane and responds to the variation of the sharpness of the object image formed by the optical system in such a manner as to produce an output of an extreme value when the sharpness of the image is maximized; and electrical current means which is electrically connected to said transducing means and produces an output signal corresponding to the positional change of the optical system on said axis on the basis of the output of said transducing means, the electrical circuit means being arranged to produce said control signal by detecting the extreme value output of the transducing means, and said gate control means being electrically connected to said electrical circuit means and controlling said gate means in response to the output of the electrical circuit means.

8. An object distance measuring system comprising:

A. an image forming optical system capable of forming an image of an object, the optical system having an optical axis and being arranged to be shiftable along the axis from a predetermined first position on the axis to a second position in which the image of the object is placed on a destined image forming plane;

B. driving means operatively connected to said optical system to drive the optical system at a constant speed from said first position toward said second position;

C. detecting means for detecting the positional variation of said optical system on the optical axis, said detecting means being responsive to the positional variation of the optical system and producing a signal for stopping the optical system when the optical system reaches the second position said driving means being electrically connected to said detecting means and stopping the shifting of said optical system in response to said signal produced by said detecting means;

D. time counting means for counting the time required for shifting the optical system from the first position to the second position, the time counting means producing a digital signaloutput corresponding to the time relative to the shifting of the optical system; and E. displaying means for digitally displaying the object distance, the displaying means being electrically connected to said counting means and digitally displaying the distance to the object based on the digital signal output of the counting means corresponding to said time.

9. An object distance measuring system according to claim 8, further comprising:
manually operable actuating means for starting said driving means, said actuating means being operatively connected to said driving means, said time counting means being responsive to said actuating means and to said signal produced by said detecting means and operating in such a manner as to commence the counting of the time required for shifting of said optical system from said first position to said second position almost synchronously with the start of the shifting of the optical system and to discontinue the counting of the time in response to the signal produced by the detecting means.

10. An object distance measuring system according to claim 9, wherein said driving means includes:
motor means operatively connected to said optical system to drive the same along the optical axis, said motor means being operatively connected to said actuating means and being electrically connected to said detecting means, and operating in such a manner as to start the shifting of the optical system in response to said actuating means and to stop the shifting of the optical system in response to said signal produced by said detecting means.

11. An object distance measuring system comprising:
A. an image forming optical system capable of forming an image of an object, the optical system having an optical axis and being arranged to be shiftable along the axis from a predetermined first position on the axis to a second position in which the image of the object is placed on a destined image forming plane;
B. driving means for driving said optical system at a constant speed from said first position toward said second position, said driving means including motor means operatively connected to said optical system to drive the optical system;
C. manually operable actuating means operatively connected to said motor means for starting the motor means;
D. time counting means for counting the time required for shifting the optical system from the first position to the second position and produces a digital signal output corresponding to the time relative to the shifting of the optical system, said counting means including;
D-1. responsive means which is responsive to the positional variation of said optical system on the optical axis, the responsive means detecing the positional variation of the optical system and producing a control signal when the optical system reaches the second position;
D-2. a pulse output circuit which produces preset timing pulses at given time intervals, the pulse output circuit being responsive to said actuating means and being electrically connected to said responsive means, and operating in such a manner as to commence the output of said pulses almost synchronously with start of said motor means to discontinue the output of the pulses in response to the control signal produced by said responsive means; and
D-3. a pulse counter which is electrically connected to said pulse output circuit and produces a digital signal corresponding to said time by counting the number of pulses produced by the pulse output circuit; and
E. displaying means for digitally displaying the object distance, the displaying means being electrically connected to said counting means and digitally displaying the distance to the object based on the digital signal output of the counting means corresponding to said time.

12. An object distance measuring system according to claim 11, wherein said responsive means includes: detecting means for detecting the sharpness of the object image formed by said optical system, the detecting means being disposed at least virtually on the vicinity of the destined image forming plane and producing said control signal when the sharpness of the image of the object formed on the destined image forming plane is maximized, said pulse output circuit being electrically connected to said detecting means and ceasing to produce said pulses in response to the output signal of the detecting means.

13. An object distance measuring system according to claim 12, wherein said detecting means includes:
photoelectric transducing means which responds to the sharpness of the object image formed by the optical system and produces an extreme value output when the image sharpness is maximized, the photoelectric transducing means being disposed virtually on the destined image forming plane so as to be responsive to variation in the image sharpness on the plane; and
electrical circuit means which is electrically connected to said transducing and detects the sharpness of the object image on the basis of the output of the transducing means, the electrical circuit means producing said control signal when the output of the transducing means reached the extreme value, said pulse output circuit being electrically connected to said electric circuit means and ceasing to produce said pulses in response to the output of the electric circuit means.

14. An object distance measuring system according to claim 13, wherein said output circuit includes:
a pulse generator which generates said preset timing pulses at said preset time intervals; and
a gate circuit which controls the transmission of the pulses generated by the pulse generator said gate circuit being responsive to said manually operable actuating means and being electrically connected to said electrical circuit means and to said pulse generator so as to start the transmission of said pulses almost synchronously with the start of said motor means and to cease the transmission of the pulses in response to the control signal produced by the electrical circuit means, said pulse counter being electrically connected to said gate circuit and counting the number of pulses transmitted through the gate circuit.

15. An object distance measuring system according to claim 14, said gate circuit includes:
gate means which is electrically connected to said pulse generator and is switchable between a first state in which the gate means allows the passage of the pulses generated by the pulse generator and a second state in which the gate means prohibits the passage of the pulses; and
gate control means, for controlling the switching of said gate means, said gate control means being responsive to said manually operable actuating means and being electically connected to said electrical circuit means and to said gate means, and operating in such a manner as to set the gate means in the first state almost synchronously with the start of said motor means and to switch set the gate means into said second state in response to the control signal produced by the electrical circuit means, said pulse counter, being electrically connected to the gate means and counting the number of pulses transmitted through the gate means.

16. An object distance measuring system comprising:
an image forming optical system for forming an image of an object said optical system having an optical axis and being movable along the optical axis from a predetermined position on the axis for forming the object image on a destined image forming plane;

driving means for driving the optical system from the predetermined position in a predetermined direction at a given constant speed, the driving means being operatively connected to the optical system;

actuating means for causing the driving means to start, the actuating means being operatively connected to the driving means;

detecting means for detecting the sharpness of the object image formed by said optical system, the detecting means being located at least virtually on said destined image forming plane and producing a control signal when the sharpness of the image reaches a maximum degree on the destined image forming plane;

pulse output means for producing pulses at preset time intervals, said pulse output means, being responsive to said actuating means and being electrically connected to said detecting means, and operating in such a manner as to commence the output of the pulses almost synchronously with the start of said driving means and to cease the output of said pulses in response to the control signal produced by the detecting means;

pulse counting means for counting the number of the output pulses produced by the pulse output means, the pulse counting means being electrically connected to said pulse output means and producing a digital signal output corresponding to the number of pulses counted; and displaying means for digitally displaying the object distance, said displaying means being electrically connected to said counting means, and digitally displaying the distance to the object on the basis of the digital signal output from said counting means.

17. An object distance measuring system according to claim 16, wherein said detecting means includes:
photoelectric transducing means which is responsive to variation in the sharpness of the object image formed by the optical system and produces an extreme value output when the image sharpness is maximized, the transducing means being located virtually on said destined image forming plane so as to be responsive to the variation of the image sharpness on the destined image forming plane; and electrical circuit means which is electrically connected to said transducing means and detects the sharpness of the object image based on the output of the transducing means, said circuit means producing said control signal when the output of the transducing means reaches the extreme value, said pulse output means being electrically connected to said electrical circuit means and closing the output of said pulses in response to the output of the electrical circuit means.

18. An object distance measuring system according to claim 16, wherein said pulse means includes:
a pulse generator which generates said pulses at said preset time intervals; and a gate circuit for controlling the transmission of the pulses generated by said pulse generator, said gate circuit, being responsive to said actuating means and being electrically connected to said detecting means and to said pulse generator, and operating in such a manner as to commence the transmission of the pulses almost synchronously with the start of the driving means and to discontinue the transmission of the pulses in response to the control signal output of the detecting means, said pulse counting means being electrically connected to said gate circuit and counting the number of pulses transmitted through the gate circuit.

19. An object distance measuring system according to claim 18, wherein said gate circuit includes:
gate means electrically connected to said pulse generator, said gate means being switchable between a first state in which the gate means allows the passage of the pulses generated by the pulse generator and a second state in which the gate means prohibits the passage of the pulses; and gate control means for controlling the switching of said gate means, said gate means control means, being responsive to said actuating means and being electrically connected to said detecting means and to said gate means, and operating in such a manner as to set the gate means in said first state almost synchronously with the start of said driving means and to switch the gate means to said second state in response to said control signal output from said detecting means, said pulse counting means being electrically connected to said gate means and counts the number of pulses transmitted through the gate means.

20. An object distance measuring system comprising:
an image forming optical system for forming an image of an object, said optical system, having an optical axis, and being movable along the optical axis from a preset position on the axis for forming the object image on a destined image forming plane;

driving means for driving the optical system at a given constant speed in a predetermined direction from the preset position, the driving means being operatively connected to the optical system;

actuating means operatively connected to the driving means for causing the driving means to start;

photoelectric transducing means which is responsive to variation in the sharpness of the object image formed by the optical system and produces an extreme value output when the image sharpness is maximized, the transducing means being located virtually on said destined image forming plane so as to be responsive to the variation of the image sharpness on the image forming plane;

detecting circuit means which is electrically connected to said transducing means and detects the sharpness of the object image based on the output of the transducing means, said circuit means producing a control signal output when the output of the transducing means reaches the value;

pulse generating means which generates pulses at preset time intervals;

gate circuit means for controlling the transmission of the pulses generated by said pulse generating means, said gate circuit means which, being responsive to said actuating means and being electrically connected to said detecting circuit means and to said pulse generating means, and operating in such a manner as to commence the transmission of the pulses almost synchronously with the start of said driving means and to discontinue the transmission of the pulses in response to said control signal output of the detecting circuit means;

pulse counting means which is electrically connected to said gate circuit means and counts the number of the pulses transmitted through the gate circuit means, said counting producing a digital signal output corresponding to the number of the pulses counted; and displaying means for digitally displaying the object distance, said displaying means, being electrically connected to said pulse counting means and digitally displaying the distance to the object based on the digital signal ouput derived from the counting means.

21. An object distance measuring system comprising:
an image forming optical system for forming an image of an object, said optical system, having an optical axis and being movable along the optical axis from a preset position on the axis for forming the object image on a destined image forming plane;

driving means for driving the optical system at a given constant speed in a predetermined direction from the preset position, the driving means being operatively connected to the optical system;

actuating means operatively connected to said driving means for causing the driving means to start;

photoelectric transducing means which is responsive to variation in the sharpness of the object image formed by the optical system and produces an extreme value output when the image sharpness is maximized, the transducing means being located virtually on said destined image forming plane so as to be responsive to the variation of the image sharpness on the image forming plane;

detecting circuit means which is electrically connected to said transducing means and detects the sharpness of the object image based on the output of the transducing means said circuit means producing a control signal output when the output of the transducing means reaches the extreme value;

pulse generating means which generates pulses at preset time intervals;

gate means electrically connected to said pulse generating means, said gate means being switchable between a first state in which the pulses generated by the pulse generating means are allowed to pass through and a second state in which the passing of the pulses is prohibited;

gate control means for controlling the switching of said gate means, said gate control means being responsive to said actuating means and being electrically connected to said detecting circuit means and to said gate means for controlling the switching of the gate means in such a manner as to set the gate means in the first state almost synchronously with start of said driving means and to switch the gate means into the second state in response to said control signal output of the detecting circuit means;

pulse counting means which is electrically connected to said gate means and counts the number of the pulses transmitted through the gate means said counting means producing a digital signal output corresponding to the number of the pulses counted; and displaying means for digitally displaying the object distance, said displaying means and digitally displaying the distance to the object based on the digital signal output derived from the pulse counting means.

22. An object distance measuring system in a camera comprising:

an image forming optical system for forming an image of an object being photographed by said camera, said optical system having an optical axis, is capable of forming an image of an object and being movable along the optical axis from a preset position on the axis for forming the object image on a destined image forming plane;

urging means operatively connected to said optical system to retain the optical system in said preset position;

driving means for driving the optical system against the urging force of said urging means at a given constant speed in a predetermined direction from said preset position, the driving means being operatively connected to the optical system;

actuaing means operatively connected to said driving means for causing the driving means to start;

photoelectric transducing means which is responsive to variation in the sharpness of the object image formed by the optical system and produces an extreme value output when the image sharpness is maximized, the transducing means being located virtually on said destined image forming plane so as to be responsive to the variation of the image sharpness on the image forming plane;

detecting circuit means which is electrically connected to said transducing means and to said driving means and detects the sharpness of the object image based on the output of the transducing means, said circuit means producing a control signal output to stop the driving means when the output of the transducing means reaches the extreme value;

pulse generating means which generates pulses at preset time intervals;

gate means electrically connected to said pulse generating means, said gate means being switchable between a first state in which the pulses generated by the pulse generating means are allowed to pass through and a second state in which the passing of the pulses is prohibited;

gate control means for controlling the switching of said gate means, said gate control means being responsive to said actuating means and being electrically connected to said detecting circuit means and to said gate means for controlling the switching of the gate means in such a manner as to set the gate means in the first state almost synchronously with the start of said driving means and to switch the gate means into the second state in response to said control signal output of the detecting circuit means;

pulse counting means which is electrically connected to said gate means and counts the number of the pulses transmitted through the gate means, said counting means producing a digital signal output corresponding to the number of the pulses counted; and for digitally displaying the object distance, said displaying means being electrically connected to said pulse counting means and digitally displaying the distance from the camera to the object based on the digital signal output derived from the pulse counting means.

* * * * *